US012763809B2

(12) United States Patent
Abdelatty et al.

(10) Patent No.: US 12,763,809 B2
(45) **Date of Patent: *Oct. 13, 2026**

(54) COUPLING MITIGATION FOR COEXTENSIVE SIGNAL PATHS WITH RESONANT MATCHING NETWORKS

(71) Applicant: Apple Inc., Cupertino, CA (US)

(72) Inventors: Omar A Abdelatty, Sunnyvale, CA (US); Kefei Wu, San Diego, CA (US); Woorim Shin, Palo Alto, CA (US); Yi Zhao, San Jose, CA (US)

( * ) Notice: Subject to any disclaimer, the term of this patent is extended or adjusted under 35 U.S.C. 154(b) by 353 days.

This patent is subject to a terminal disclaimer.

(21) Appl. No.: 18/475,123

(22) Filed: Sep. 26, 2023

(65) Prior Publication Data

US 2024/0250710 A1 Jul. 25, 2024

Related U.S. Application Data

(63) Continuation of application No. 18/157,772, filed on Jan. 20, 2023, now Pat. No. 12,567,875.

(51) Int. Cl.

| | |
|---|---|
| ***H04B 1/06*** | (2006.01) |
| ***H03F 1/38*** | (2006.01) |
| ***H03F 1/56*** | (2006.01) |
| ***H03F 3/00*** | (2006.01) |
| ***H03F 3/24*** | (2006.01) |
| ***H03F 3/45*** | (2006.01) |
| ***H03F 3/68*** | (2006.01) |
| ***H04B 1/40*** | (2015.01) |

(52) U.S. Cl.

CPC .................................... *H04B 1/40* (2013.01)

(58) Field of Classification Search

None

See application file for complete search history.

(56) References Cited

U.S. PATENT DOCUMENTS

| | | | | |
|---|---|---|---|---|
| 7,592,865 | B2 | 9/2009 | Park et al. | |
| 7,928,802 | B2 | 4/2011 | Ohnishi et al. | |
| 8,049,573 | B2 | 11/2011 | Alfano et al. | |
| 8,912,845 | B2 * | 12/2014 | Jordan | H03F 3/195 330/283 |
| 8,971,831 | B2 * | 3/2015 | Vidojkovic | H04B 1/18 455/280 |
| 9,209,525 | B2 | 12/2015 | Schantz et al. | |
| 10,135,122 | B2 | 11/2018 | Apostolos et al. | |

(Continued)

*Primary Examiner* — Pablo N Tran

(74) *Attorney, Agent, or Firm* — Treyz Law Group, P.C.; Michael H. Lyons

(57) ABSTRACT

An electronic device may be provided with wireless circuitry that includes a transceiver. The transceiver may include a first signal path and a second signal path extending parallel to the first signal path. The first signal path may include a first chain of gain stages and a first inductive matching network. The second signal path may include a second chain of gain stages and a second inductive matching network. The first inductive matching network may be magnetically coupled to the second inductive matching network. The first and/or second signal path may include one or more crossovers that invert a polarity of the signals on the signal paths. The crossovers may help to mitigate the effects of the magnetic coupling between the first and second signal paths while allowing for minimal spatial separation between the signal paths.

20 Claims, 4 Drawing Sheets

(56) References Cited

U.S. PATENT DOCUMENTS

| | | | | |
|---|---|---|---|---|
| 10,693,231 | B2 * | 6/2020 | Dunworth | H01Q 5/335 |
| 11,043,918 | B2 * | 6/2021 | Tanaka | H03F 1/0222 |
| 11,128,338 | B2 * | 9/2021 | Park | H04W 88/02 |
| 11,750,230 | B1 * | 9/2023 | Li | H03F 3/245<br>330/295 |
| 2006/0214719 | A1 * | 9/2006 | Watanabe | H03F 3/3001<br>327/333 |
| 2011/0115565 | A1 * | 5/2011 | Cabanillas | H03F 3/72<br>330/307 |
| 2012/0056297 | A1 * | 3/2012 | Akhtar | H01L 23/5227<br>257/E21.022 |
| 2014/0077919 | A1 * | 3/2014 | Godoy | H01F 30/08<br>336/226 |
| 2014/0273901 | A1 * | 9/2014 | Liu | H04W 52/0238<br>455/226.1 |
| 2021/0044459 | A1 | 2/2021 | Raclaw et al. | |
| 2022/0200576 | A1 | 6/2022 | Zhan et al. | |
| 2022/0224295 | A1 * | 7/2022 | Dinc | H03F 3/245 |
| 2025/0096735 | A1 * | 3/2025 | Ibrahim | H03F 3/195 |

* cited by examiner

COUPLING MITIGATION FOR COEXTENSIVE SIGNAL PATHS WITH RESONANT MATCHING NETWORKS

This application is a continuation of U.S. patent application Ser. No. 18/157,772, filed Jan. 20, 2023, which is hereby incorporated by reference herein in its entirety.

FIELD

This disclosure relates generally to electronic devices and, more particularly, to electronic devices with wireless communications circuitry.

BACKGROUND

Electronic devices are often provided with wireless communications capabilities. An electronic device with wireless communications capabilities has wireless communications circuitry with one or more antennas. The wireless communications circuitry can have multiple signal paths.

It is challenging to form satisfactory wireless communications circuitry having multiple signal paths in an electronic device. If care is not taken, undesirable magnetic coupling can be present between the signal paths or the wireless communications circuitry can occupy an excessive amount of space within the electronic device.

SUMMARY

An electronic device may include wireless circuitry for performing wireless communications. The wireless circuitry may include a transceiver, an antenna, and baseband circuitry. The transceiver may include at least a first signal path that conveys a first signal and a second signal path that conveys a second signal. The second signal path may extend parallel to the first signal path.

The first signal path may include a first chain of gain stages. The second signal path may include a second chain of gain stages. The gain stages may include attenuators or amplifiers, as examples. The first signal path may include a first inductive matching network interspersed among the first chain of gain stages. The second signal path may include a second inductive matching network interspersed among the second chain of gain stages. The first inductive matching network may include transformers or other inductive components that are magnetically coupled to transformers or other inductive components in the second inductive matching network.

The first signal path and/or the second signal path may include one or more crossovers. The crossovers may serve to invert a polarity of the signals on the signal paths. The crossovers may help to mitigate the effects of the magnetic coupling between the first and second signal paths without affecting the signals propagated along the first and second signal paths. This may serve to maximize the performance of the signal paths in propagating the signals while allowing for minimal spatial separation between the signal paths, thereby minimizing space consumption within the device.

An aspect of the disclosure provides an electronic device. The electronic device can include first signal path having a first gain stage and a first transformer. The electronic device can include a second signal path that is coextensive with the first signal path. The second signal path can include a first signal line. The second signal path can include a second signal line parallel to the first signal line, the first and second signal lines being configured to convey a signal. The second signal path can include a second gain stage disposed on the first and second signal lines. The second signal path can include a second transformer disposed on the first and second signal lines. The second signal path can include a crossover between the first signal line and the second signal line that is configured to invert a polarity of the signal.

An aspect of the disclosure provides an electronic device. The electronic device can include a first signal path configured to convey a first signal. The electronic device can include a first chain of gain stages disposed on the first signal path. The electronic device can include a first inductive matching network disposed on the first signal path. The electronic device can include a second signal path extending alongside the first signal path and configured to convey a second signal. The electronic device can include a second chain of gain stages disposed on the second signal path. The electronic device can include a second inductive matching network disposed on the second signal path. The electronic device can include a crossover on the second signal path that is configured to invert a polarity of the second signal.

An aspect of the disclosure provides an electronic device. The electronic device can include one or more antennas. The electronic device can include a radio-frequency transceiver coupled to the one or more antennas. The electronic device can include a first signal path in the radio-frequency transceiver. The electronic device can include a first gain stage disposed on the first signal path. The electronic device can include a first inductor disposed on the first signal path and coupled to the first gain stage. The electronic device can include a second signal path in the radio-frequency transceiver, the second signal path having a differential pair of signal lines with a crossover point. The electronic device can include a second gain stage disposed on the second signal path. The electronic device can include a second inductor disposed on the second signal path and coupled to the second gain stage, the second inductor being magnetically coupled to the first inductor.

DETAILED DESCRIPTION

Figure 1:
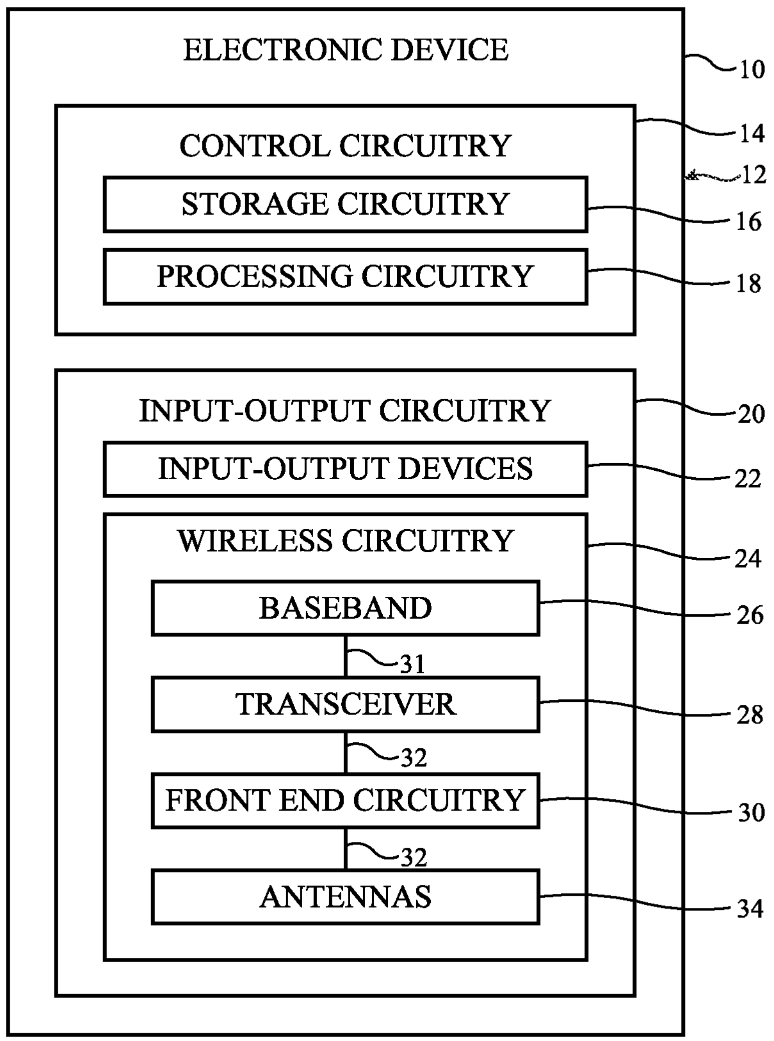
FIG. 1 is a schematic diagram of an illustrative electronic device having wireless circuitry in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the schematic diagram FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, radio-frequency front end circuitry such as front end circuitry 30, and one or more antennas 34. If desired, wireless circuitry 24 may include multiple antennas 34 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband signal paths 31. Baseband circuitry 26 may include, for example, modulators (encoders) and demodulators (decoders) that operate on baseband signals. Transceiver 28 may be coupled to antennas 34 over one or more radio-frequency transmission line paths 32 (sometimes referred to herein as radio-frequency signal paths 32). Front end circuitry 30 may be disposed on radio-frequency transmission line path(s) 32 between transceiver 28 and antennas 34.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 34. Each transceiver 28 may be coupled to one or more antennas 34 over respective radio-frequency transmission line paths 32. Each radio-frequency transmission line path 32 may have respective front end circuitry 30 disposed thereon. If desired, front end circuitry 30 may be shared by multiple radio-frequency transmission line paths 32.

Radio-frequency transmission line path 32 may be coupled to antenna feeds on one or more antennas 34. Each antenna feed may for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 34 may be fed using any desired antenna feeding scheme.

Radio-frequency transmission line path 32 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission, baseband circuitry 26 may provide baseband signals to transceiver 28 over baseband signal path(s) 31. Transceiver 28 (e.g., one or more transmitters in transceiver 28) may include circuitry for converting the baseband signals received from baseband circuitry 26 into corresponding radio-frequency signals. For example, transceiver 28 may include mixer circuitry for up-converting the baseband signals to radio frequencies prior to transmission over antennas 34. Transceiver 28 may also include digital to analog converter (DAC) and/or analog to digital converter (ADC) circuitry for converting signals between digital and analog domains. Transceiver 28 may transmit the radio-frequency signals over antennas 34 via radio-frequency transmission line path 32 and front end circuitry 30. Antennas 34 may transmit the radio-frequency signals to external wireless equipment by radiating the radio-frequency signals into free space.

In performing wireless reception, antennas 34 may receive radio-frequency signals from the external wireless equipment. The received radio-frequency signals may be conveyed to transceiver 28 via radio-frequency transmission line path 32 and front end circuitry 30. Transceiver 28 may include circuitry for converting the received radio-frequency signals into corresponding baseband signals. For example, transceiver 28 may include one or more receivers having mixer circuitry for down-converting the received radio-frequency signals to baseband frequencies prior to conveying the baseband signals to baseband circuitry 26.

Front end circuitry 30 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in front end circuitry 30 may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 34 to the impedance of radio-frequency transmission line path 32), antenna tuning circuitry (e.g., networks of capacitors, resistors, inductors, and/or switches that adjust the frequency response of antennas 34), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 34.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14.

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Antennas 34 may be formed using any desired antenna structures. For example, antennas 34 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Parasitic elements may be included in antennas 34 to adjust antenna performance.

Filter circuitry, switching circuitry, impedance matching circuitry, and other circuitry may be interposed within radio-frequency transmission line path 32, may be incorporated into front end circuitry 30, and/or may be incorporated into antennas 34 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antennas 34 over time.

In general, transceiver 28 may cover (handle) any suitable communications (frequency) bands of interest. The transceiver may convey radio-frequency signals using antennas 34 (e.g., antennas 34 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 34 may transmit the radio-frequency signals by radiating the radio-frequency signals into free space (or to free space through intervening device structures such as a dielectric cover layer). Antennas 34 may additionally or alternatively receive the radio-frequency signals from free space (e.g., through intervening devices structures such as a dielectric cover layer). The transmission and reception of radio-frequency signals by antennas 34 each involve the excitation or resonance of antenna currents on an antenna resonating element in the antenna by the radio-frequency signals within the frequency band(s) of operation of the antennas.

In example where multiple antennas 34 are arranged in a phased antenna array, each antenna 34 may form a respective antenna element of the phased antenna array. Conveying radio-frequency signals using the phased antenna array may allow for greater peak signal gain relative to scenarios where individual antennas 34 are used to convey radio-frequency signals. In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. In scenarios where millimeter or centimeter wave frequencies are used to convey radio-frequency signals, a phased antenna array may convey radio-frequency signals over short distances that travel over a line-of-sight path. To enhance signal reception for millimeter and centimeter wave communications, the phased antenna array may convey radio-frequency signals using beam steering techniques (e.g., schemes in which antenna signal phase and/or magnitude for each antenna in an array are adjusted to perform beam steering).

For example, each antenna 34 in the phased antenna array may be coupled to a corresponding phase and magnitude controller in front end circuitry 30. The phase and magnitude controllers may adjust the relative phases and/or magnitudes of the radio-frequency signals that are conveyed by each of the antennas 34 in the phased antenna array. The wireless signals that are transmitted or received by the phased antenna array in a particular direction may collectively form a corresponding signal beam. The signal beam may exhibit a peak gain that is oriented in a particular pointing direction at a corresponding pointing angle (e.g., based on constructive and destructive interference from the combination of signals from each antenna in the phased antenna array). Control circuitry 14 may adjust the phase and magnitude controllers to change the direction of the signal beam over time (e.g., to allow device 10 to continue to communicate with external equipment even if the external equipment moves relative to device 10 over time). This example is merely illustrative and, in general, antennas 34 need not be arranged in a phased antenna array.

Figure 2:
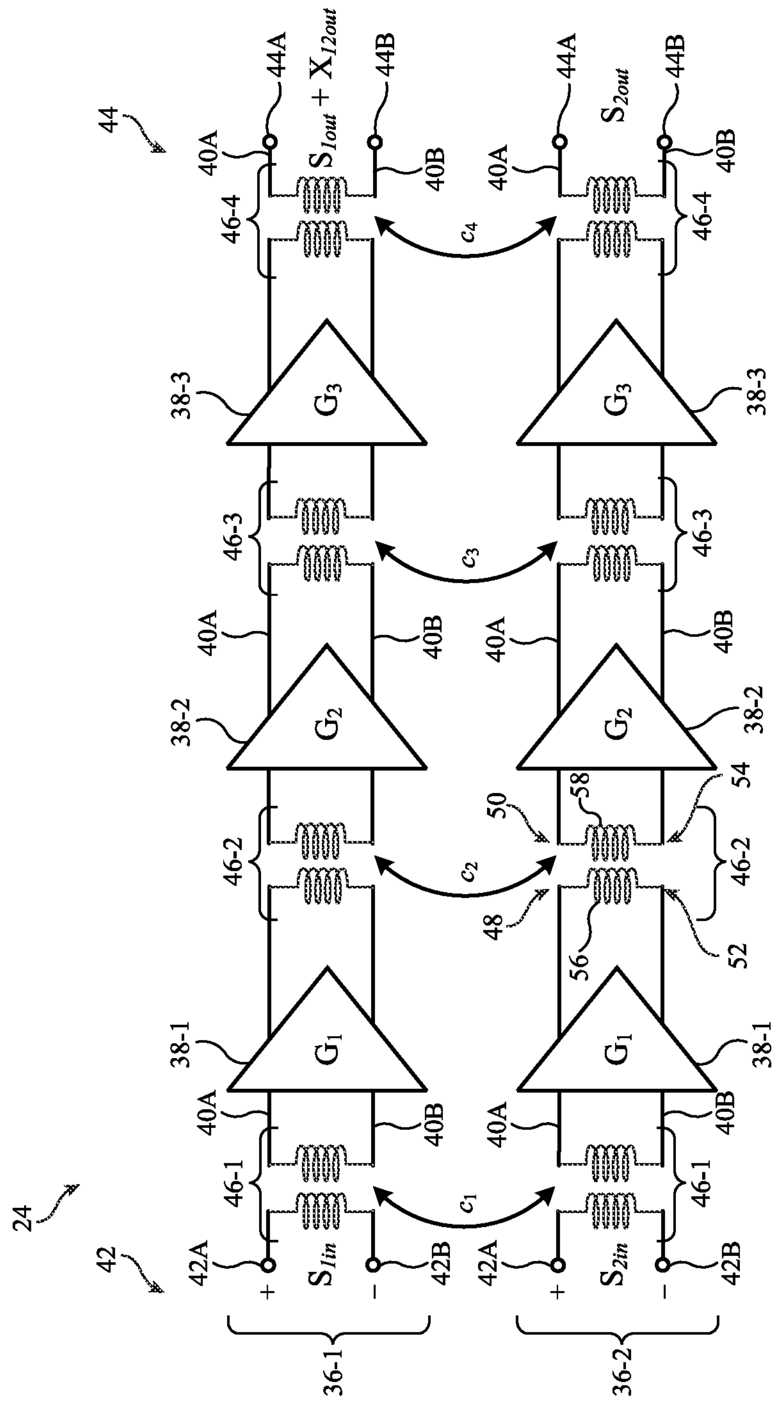
FIG. 2 is a circuit diagram of illustrative wireless circuitry having parallel signal paths with gain stages and resonant matching networks in accordance with some embodiments.

Wireless circuitry 24 may include two or more parallel signal paths. The parallel signal paths may include one or more gain stages. The signal paths may include resonant impedance matching networks. The resonant impedance matching networks may for example, include inductive elements such as inductors and/or transformers that help to tune out capacitive parasitics associated with the signal paths. FIG. 2 is a circuit diagram showing two parallel signal paths in wireless circuitry 24.

As shown in FIG. 2, wireless circuitry 24 may include two or more parallel signal paths 36 such as at least a first signal path 36-1 and a second signal path 36-2. Signal paths 36 may be coupled in parallel between an input component (e.g., a signal source) and an output component (e.g., a signal destination) and/or may extend in a parallel direction to each other along some or all of their lengths (e.g., on an integrated circuit, chip, or other substrate). Put differently, the parallel portions of signal paths 36 may run alongside each other on one or more substrates, may extend in the same direction (e.g., at an orientation between −30 degrees and +30 degrees with respect to each other), may be coextensive with respect to each other, etc. Signal paths 36 may be signal paths within transceiver 28 of FIG. 1 (e.g., radio-frequency signal paths that convey radio-frequency signals in one or more polarizations such as orthogonal linear polarizations, baseband signal paths that convey baseband signals, clocking signal paths such as signal paths in a local oscillator (LO) distribution network that distributes LO signals to multiple mixers, signal paths for distributing signals to different antenna elements of a phased antenna array, different signal paths in a multiple-input and multiple-output (MIMO) transceiver for distributing signals to multiple antennas, etc.), may be signal paths within baseband circuitry 26 of FIG. 1, may be signal paths within front end circuitry 30 of FIG. 1, may be signal paths of radio-frequency transmission line paths 32 of FIG. 1, and/or may be signal paths within baseband signal paths 31 of FIG. 1, as examples.

Each signal path 36 may have a corresponding input 42 and a corresponding output 44. In the example of FIG. 2, each signal path 36 is a differential signal path having a corresponding differential pair of signal lines 40A and 40B coupled in parallel between the input 42 and the output 44 of that signal path 36. Input 42 may include a first input terminal 42A coupled to signal line 40A and a second input terminal 42B coupled to signal line 40B. Output 44 may include a first output terminal 44A coupled to signal line 40A and a second output terminal 44B coupled to signal line 40B.

Each signal path 36 may receive a respective input signal $S_{in}$ at its input 42. For example, signal path 36-1 may receive input signal $S_{1in}$ at its input 42 whereas signal path 36-2 receives input signal $S_{2in}$ at its input 42. Input signals $S_{in}$ may be, for example, radio-frequency signals (e.g., having orthogonal polarizations when signal paths 36 are implemented in a dual-polarization transceiver, carrying different radio-frequency signals for different antennas under a MIMO scheme when signal paths 36 are implemented in a MIMO transceiver, carrying different radio-frequency signals for different antenna elements in a phased antenna array, etc.), baseband signals, clocking signals (e.g., different LO signals or LO phases provided to different mixers), or any other desired signals distributed in parallel within wireless circuitry 24.

Each signal path 36 may distribute (propagate) the corresponding input signal $S_{in}$ from its input 42 onto its output 44 over signal lines 40A and 40B (as output signals $S_{out}$). For example, signal path 36-1 may pass input signal $S_{1in}$ along its signal lines 40A and 40B and may output the signal as output signal $S_{1out}$ at its output terminals 44A and 44B. Similarly, signal path 36-2 may pass input signal $S_{2in}$ along its signal lines 40A and 40B and may output the signal as output signal $S_{2out}$ at its output terminals 44A and 44B.

Each signal path 36 may include a respective chain of one or more gain stages 38 disposed on its signal lines 40A and 40B. For example, as shown in FIG. 2, each signal path 36 may include a chain of at least a first gain stage 38-1, a second gain stage 38-2, and a third gain stage 38-3 (sometimes referred to herein as an amplifier chain in implementations where gain stages 38 include amplifiers). Each gain stage 38 may include any desired circuitry that applies a corresponding fixed or adjustable gain G to the signal that passes over the corresponding signal lines 40A and 40B (e.g., gain stage 38-1 may apply gain $G_1$, gain stage 38-2 may apply gain $G_2$, gain stage 38-3 may apply gain $G_3$, gain stage 38-4 may apply gain $G_4$, etc.). Gain stages 38 may include, for example, amplifiers such as variable gain amplifiers, low noise amplifiers, or power amplifiers, fixed or variable (e.g., programmable) attenuators, or any other desired circuits that apply gain to an input signal.

If care is not taken, parasitic capacitances along signal paths 36 may undesirably limit the efficiency with which signal paths 36 propagate signals. To mitigate parasitic capacitances, each signal path 36 may include a resonant matching network that includes one or more inductive components disposed along signal lines 40A and 40B. For example, each signal path 36 may include a respective network of transformers 46 interspersed among the gain stages 38 on that signal path 36.

As shown in FIG. 2, each signal path 36 may include at least a first transformer 46-1, a second transformer 46-2, a third transformer 46-3, and a fourth transformer 46-4 disposed on signal lines 40A and 40B. Transformer 46-1 (sometimes referred to herein as input transformer 46-1) may be disposed on signal lines 40A and 40B between the input of gain stage 38-1 and input 42. Transformer 46-2 may be disposed on signal lines 40A and 40B between the output of gain stage 38-1 and the input of gain stage 38-2. Transformer 46-3 may be disposed on signal lines 40A and 40B between the output of gain stage 38-2 and the input of gain stage 38-3. Transformer 46-4 (sometimes referred to herein as output transformer 46-4) may be disposed on signal lines 40A and 40B between the output of gain stage 38-3 and output 44.

Each transformer 46 may include at least a first inductor 56 and a second inductor 58 that is magnetically coupled to first inductor 56. First inductor 56 may have a first terminal 48 coupled to signal line 40A and an opposing second terminal 52 coupled to signal line 40B. Second inductor 58 may have a first terminal 50 coupled to signal line 40A and an opposing second terminal 54 coupled to signal line 40B. Terminals 48-54 may sometimes be referred to herein as terminals of transformer 46.

The terminal 48 of transformer 46-1 may be coupled to input terminal 42A over signal line 40A, the terminal 50 of transformer 46-1 may be coupled to the input of gain stage 38-1 over signal line 40A, the terminal 52 of transformer 46-1 may be coupled to input terminal 42B over signal line 40B, and the terminal 54 of transformer 46-1 may be coupled to the input of gain stage 38-1 over signal line 40B. The terminal 48 of transformer 46-2 may be coupled to the output of gain stage 38-1 over signal line 40A, the terminal 50 of transformer 46-2 may be coupled to the input of gain stage 38-2 over signal line 40A, the terminal 52 of transformer 46-2 may be coupled to the output of gain stage 38-1 over signal line 40B, and the terminal 54 of transformer 46-2 may be coupled to the input of gain stage 38-2 over signal line 40B. The terminal 48 of transformer 46-3 may be coupled to the output of gain stage 38-2 over signal line 40A, the terminal 50 of transformer 46-3 may be coupled to the input of gain stage 38-3 over signal line 40A, the terminal 52 of transformer 46-3 may be coupled to the output of gain stage 38-2 over signal line 40B, and the terminal 54 of transformer 46-3 may be coupled to the input of gain stage 38-3 over signal line 40B. The terminal 48 of transformer 46-4 may be coupled to the output of gain stage 38-3 over signal line 40A, the terminal 50 of transformer 46-4 may be coupled to output terminal 44A over signal line 40A, the terminal 52 of transformer 46-4 may be coupled to the output of gain stage 38-3 over signal line 40B, and the terminal 54 of transformer 46-4 may be coupled to output terminal 44B over signal line 40B.

The example of FIG. 2 in which the resonant matching network of signal paths 36 includes transformers 46 is illustrative and non-limiting. If desired, one or more of the transformers 46 on signal paths 36 may be replaced by one or more inductors (e.g., inductive networks having any desired number of inductors coupled together in any desired manner, inductors coupled between signal lines 40A and 40B, inductors coupled between signal lines 40A and/or 40B and ground or another reference potential, etc.) or any other desired inductive components. If desired, one or more of the transformers 46 in signal paths 36 may be omitted.

In an ideal scenario, the output signal $S_{out}$ produced by each signal path 36 is given by the product of input signal $S_{in}$ and each of the gains G imparted by the gain stages 38 along that signal path 36. For example, in an ideal case, the output signal $S_{1out}$ produced by signal path 36 is described by the equation $S_{1out}=G_3G_2G_1S_{1in}$. However, in practice, the inductive components (e.g., transformers 46) of signal path 36-2 are subject to magnetic coupling from the inductive components (e.g., transformers 46) of signal path 36-1. For example, there may be a magnetic coupling characterized by coupling constant $c_1$ between the transformers 46-1 in signal paths 36-1 and 36-2, a magnetic coupling characterized by coupling constant $c_2$ between the transformers 46-2 in signal paths 36-1 and 36-2, a magnetic coupling characterized by coupling constant $c_3$ between the transformers 46-3 in signal paths 36-1 and 36-2, and a magnetic coupling characterized by coupling constant $c_4$ between the transformers 46-4 in signal paths 36-1 and 36-2.

If care is not taken, this coupling may degrade the overall performance (e.g., signal-to-noise-and-distortion ratio (SNDR)) of signal path 36-1. The coupling may for example, introduce unwanted noise (e.g., a statistical pattern) and/or distortion (e.g., a deterministic pattern) to the signal. This may cause the output signal from signal path 36-1 to be equal to $S_{1out}+X_{12out}$, where $X_{12out}$ is an additional factor associated with the magnetic coupling from signal path 36-2, given by the equation $X_{12out}=G_3G_2G_1c_1S_{2in}+G_3G_2c_2G_1S_{2in}+G_3c_3G_2G_1S_{2in}+c_4G_3G_2G_1S_{2in}$. If desired, transformers 46 may include closed-loop ground rings disposed around the inductors in the transformers to help reduce coupling. However, closed-loop ground rings are often insufficient on their own to mitigate the effects of magnetic coupling between signal paths 36-1 and 36-2. If desired, magnetic coupling may be reduced by disposing signal paths 36-1 and 36-2 very far apart within wireless circuitry 24. However, space is at a premium in device 10 and it would be desirable to be able to minimize the effects of magnetic coupling between signal paths 36-1 and 36-2 without increasing the spatial separation between the signal paths.

Figure 3:
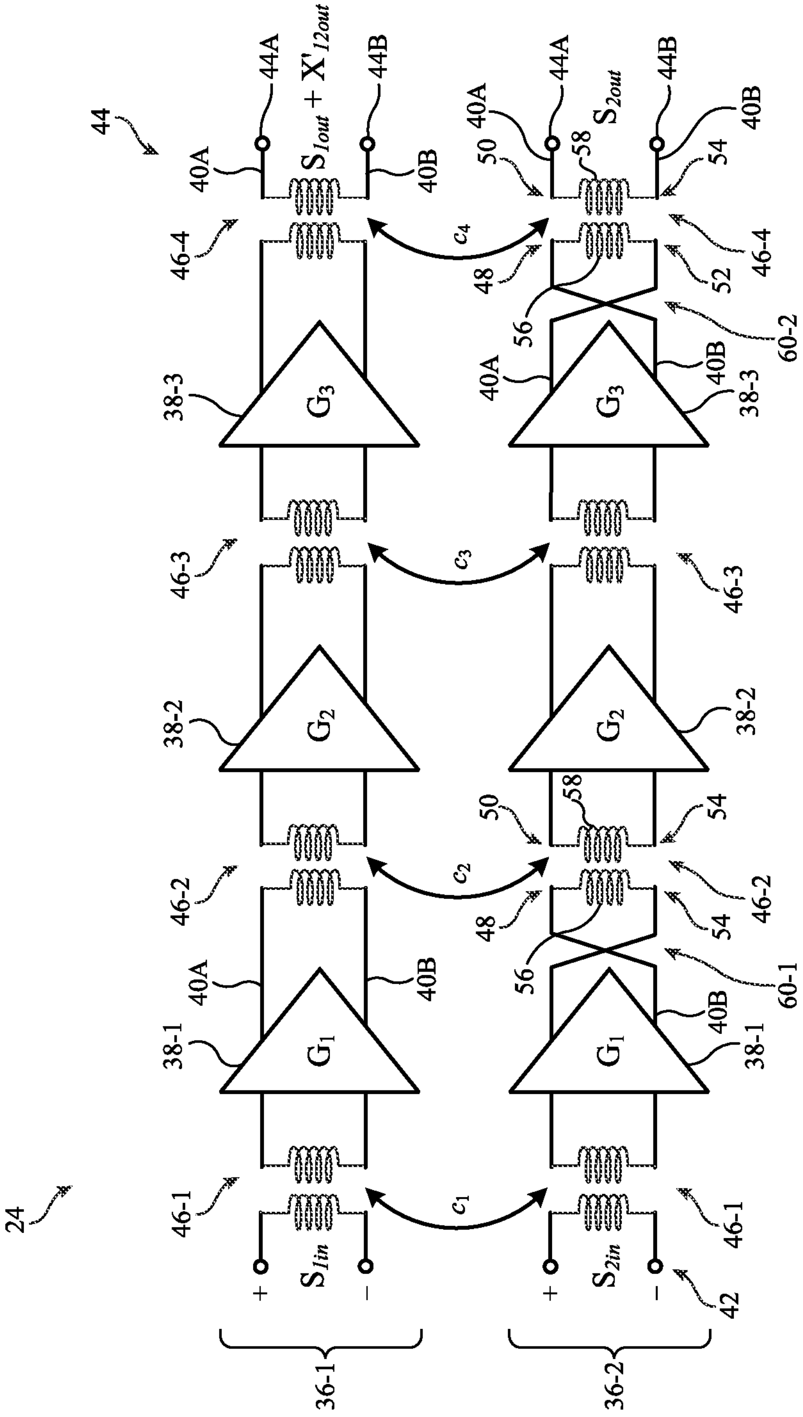
FIG. 3 is a circuit diagram showing how illustrative parallel signal paths of the type shown in FIG. 2 may be provided with one or more crossovers to mitigate parasitic coupling between the signal paths in accordance with some embodiments.

To minimize the effects of magnetic coupling between signal paths 36-1 and 36-2 without increasing the spatial separation between the signal paths, one or both of signal paths 36-1 and 36-2 may include one or more crossovers between signal lines 40A and 40B. FIG. 3 is a circuit diagram showing one example in which signal path 36-2 includes two crossovers 60 between signal lines 40A and 40B for mitigating magnetic coupling between signal paths 36-1 and 36-2.

Signal line 40A may be coupled to signal line 40B and signal line 40B may be coupled to signal line 40A at the location of each crossover 60 (sometimes referred to herein as crossover points). As shown in FIG. 3, signal path 36-2 may include a first crossover 60-1 and a second crossover 60-2 between signal lines 40A and 40B. Crossover 60-1 may be disposed along signal path 36-2 between the output of gain stage 38-1 and the input of transformer 46-2. Crossover 60-2 may be disposed along signal path 36-2 between the output of gain stage 38-3 and output 44.

In the absence of a crossover, the portion of signal lines 40A coupled to the output of gain stage 38-1 is coupled to terminal 48 of transformer 46-2 and the portion of signal line 40B coupled to the output of gain stage 38-1 is coupled to terminal 52 of transformer 46-2 (as shown in FIG. 2). At crossover 60-1 (FIG. 3), the portion of signal line 40A coupled to the output of gain stage 38-1 is instead coupled to terminal 52 of transformer 46-2 and the portion of signal path 40B coupled to the output of gain stage 38-1 is instead coupled to terminal 48 of transformer 46-2. In this way, crossover 60-1 may serve to reverse (invert) the polarity of the signal transmitted along signal path 36-2 at the input of transformer 46-2.

Similarly, in the absence of a crossover, the portion of signal line 40A coupled to the output of gain stage 38-3 is coupled to terminal 48 of transformer 46-4 and the portion of signal line 40B coupled to the output of gain stage 38-3 is coupled to terminal 52 of transformer 46-4 (as shown in FIG. 2). At crossover 60-2 (FIG. 3), the portion of signal line 40A coupled to the output of gain stage 38-3 is instead coupled to terminal 52 of transformer 46-4 and the portion of signal line 40B coupled to the output of gain stage 38-3 is instead coupled to terminal 48 of transformer 46-4. In this way, crossover 60-2 may serve to reverse (invert) the polarity of the signal transmitted along signal path 36-2 at the input of transformer 46-4.

The polarity inversion performed by each crossover 60 may serve to cancel out or suppress a pair of magnetic coupling paths. Crossovers 60-1 and 60-2 of FIG. 3 may, for example, suppress magnetic coupling between signal paths 36-1 and 36-2 such that the signal output by signal path 36-1 is equal to $S_{1out}+X_{12out}'$, where $X_{12out}'=G_3G_2G_1c_1S_{2in}-G_3G_2c_2G_1S_{2in}-G_3c_3G_2G_1S_{2in}+c_4G_3G_2G_1S_{2in}$, which is approximately equal to zero. As such, the output signal $S_{1out}$ from signal path 36-1 is approximately equal to the ideal value of $S_{1out}=G_3G_2G_1S_{1in}$ and is substantially free from distortion or noise produced by magnetic coupling from signal path 36-2. At the same time, crossovers 60 do not affect the signal propagating through the crossovers (e.g., crossovers 60 may perform coupling mitigation/suppression without compromising performance).

The example of FIG. 3 in which crossover 60-1 is disposed between gain stage 38-1 and transformer 46-2 and crossover 60-2 is disposed between gain stage 38-3 and transformer 46-4 of signal path 36-2 may serve to optimize the performance of signal paths 36-1 and 36-2 in conveying signals. However, the example of FIG. 3 is illustrative and non-limiting. If desired, crossover 60-1 or crossover 60-2 may be omitted. Signal path 36-2 may include more than two crossovers 60 (e.g., three crossovers 60, four crossovers 60, more than four crossovers 60, etc.). If desired, one or more crossovers 60 may be disposed between the input of transformer 46-1 and input 42, between the output of transformer 46-1 and the input of gain stage 38-1, between the output of gain stage 38-1 and the input of transformer 46-2, between the output of transformer 46-2 and gain stage 38-2, between the output of gain stage 38-2 and the input of transformer 46-3, between the output of transformer 46-3 and the input of gain stage 38-3, between the output of gain stage 38-3 and the input of transformer 46-4, and/or between the output of transformer 46-4 and output 44. One or more crossovers 60 may be disposed on the signal path when the signal path includes fewer than three gain stages 38 or more than three gain stages 38. If desired, multiple gain stages 38 may be disposed between consecutive transformers 46 and/or multiple transformers 46 may be disposed between consecutive gain stages 38. One or more of the transformers 46 of FIG. 3 may be replaced with any desired inductive components.

If desired, both signal path 36-1 and signal path 36-2 may include one or more crossovers 60 (e.g., crossovers 60 need not be confined to a single signal path 36). Crossovers 60 may be formed from metal layers on different layers of a substrate that are coupled together using conductive vias extending through the substrate, for example. If desired, one or more crossovers 60 may be integrated into gain stages 38. For example, a crossover 60 may be formed from transistor interconnects or thin metal layers within the input and/or output circuitry of a corresponding gain stage 38. If desired, one or more crossovers 60 may be integrated into a corresponding transformer 46 (e.g., using thick metal layers that form a portion of one or both of the inductors 56 and 58 in the transformer). If desired, crossovers 60 may be formed external to gain stages 30 and transformers 46.

In implementations where gain stages 38 include variable gain amplifiers or programmable attenuators, the highest coupling path can be identified by sweeping the gain of the variable gain amplifier or programmable attenuator, if desired. If the coupled crosstalk output varies as much as the signal, the dominant coupling path may exist before the varied gain block. If the coupled crosstalk output does not vary as much as the signal, the dominant coupling path may exist after the varied gain block.

In the example of FIGS. 2 and 3, signal paths 36-1 and 36-2 are illustrated as differential signal paths. In other implementations, signal paths 36-1 and/or 36-2 may be single-ended signal paths. In these implementations, each signal path 36 may include a single-ended signal line, gain stages 38 may be disposed on the signal line, and transformers 46 may have a first end coupled to the signal line and a second end coupled to AC ground (e.g., a reference voltage such as VSS or VDD).

Figure 4:
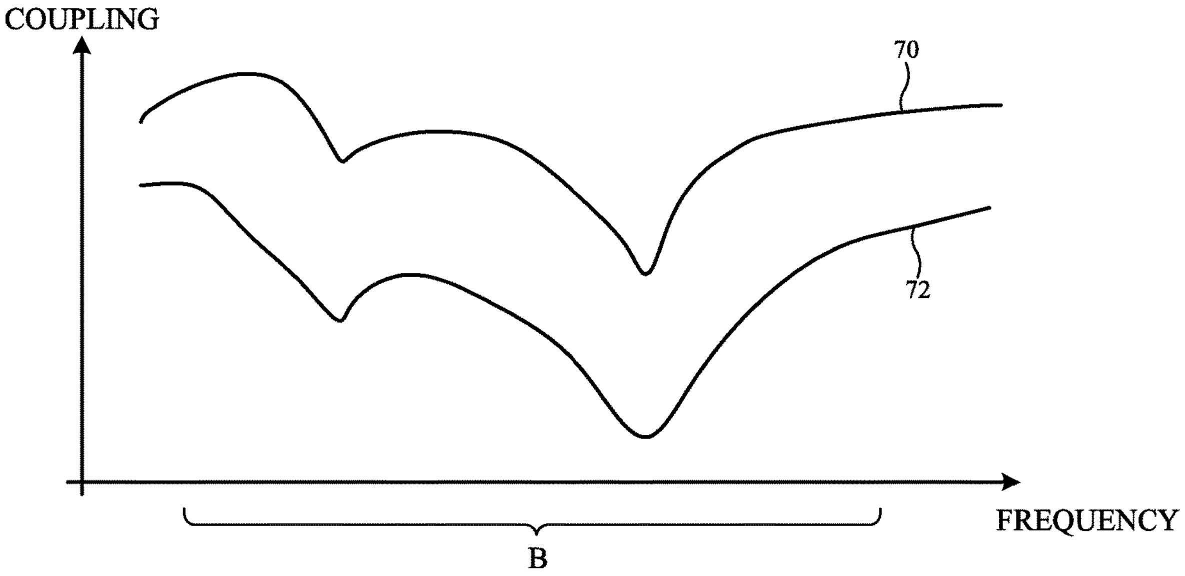
FIG. 4 is a plot showing how illustrative crossovers of the type shown in FIG. 3 may optimize radio-frequency performance of wireless circuitry in accordance with some embodiments.

FIG. 4 is a plot of coupled power as a function of frequency for a given signal path 36-1 in the presence of a nearby signal path 36-2 (e.g., a parallel signal path). Curve 70 plots the wireless performance of signal path 36-1 in the absence of crossovers 60 in either signal path. Curve 72 plots the wireless performance of signal path 36-1 in the presence of one or more crossovers 60 in one or both signal paths. As shown by curves 70 and 72, crossovers 60 may serve to reduce the coupled power along the signal path 36-1 across frequency band B by suppressing or eliminating magnetic coupling between signal paths 36-1 and 36-2. Frequency band B may include frequencies between around 20-40 GHz or any other desired frequencies. This reduction in coupled power may correspond to an increase in SNDR and the overall wireless performance of signal path 36-1 in distributing a signal from its input to its output. The example of FIG. 4 is illustrative and, in general, curves 70 and 72 may have other shapes.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-4 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An integrated circuit comprising:
- a differential signal path;
- an amplifier disposed on the differential signal path; and
- a transformer disposed on the differential signal path, wherein the differential signal path has a crossover between the amplifier and the transformer.

2. The integrated circuit of claim 1, wherein the crossover is between an output of the amplifier and the transformer.

3. The integrated circuit of claim 2, further comprising:
- an additional amplifier disposed on the differential signal path, wherein the transformer is between the crossover and an input of the additional amplifier.

4. The integrated circuit of claim 1, wherein the amplifier is a power amplifier.

5. The integrated circuit of claim 1, wherein the amplifier is a low noise amplifier.

6. The integrated circuit of claim 1, wherein the transformer has a first winding and a second winding, the first winding extends from a first terminal to a second terminal, the differential signal path includes a first signal line coupled to the first terminal and a second signal line coupled to the second terminal, and the first signal line crosses over the second signal line at the crossover.

7. The integrated circuit of claim 1, further comprising:
- an additional differential signal path; and
- an additional transformer disposed on the additional differential signal path, the transformer exhibiting a non-zero coupling constant with the additional transformer.

8. The integrated circuit of claim 7, further comprising:
- a first additional amplifier disposed on the additional differential signal path.

9. The integrated circuit of claim 8, further comprising:
- a second additional amplifier disposed on the additional differential signal path, the additional transformer being coupled between an output of the first additional amplifier and an input of the second additional amplifier.

10. The integrated circuit of claim 9, wherein the additional differential signal path is free from crossovers between the first additional amplifier and the second additional amplifier.

11. The integrated circuit of claim 1, wherein the differential signal path has an additional crossover, the transformer being between the crossover and the additional crossover.

12. Wireless circuitry comprising:
- a substrate;
- a first differential signal path on the substrate and having a first transformer;
- a second differential signal path on the substrate and having a second transformer, wherein the first transformer has a non-zero coupling constant with the second transformer;
- an amplifier disposed on the first differential signal path; and
- a crossover on the first differential signal path.

13. The wireless circuitry of claim 12, wherein the first transformer is between the crossover and an input of the amplifier.

14. The wireless circuitry of claim 13, further comprising:
- an additional crossover on the first differential signal path, wherein the amplifier is between the transformer and the additional crossover.

15. The wireless circuitry of claim 12, wherein the crossover is between the first transformer and an output of the amplifier.

16. The wireless circuitry of claim 15, further comprising:
- an additional crossover on the first differential signal path, wherein the transformer is between the crossover and the additional crossover.

17. The wireless circuitry of claim 12, wherein the amplifier comprises a power amplifier.

18. The wireless circuitry of claim 12, wherein the amplifier comprises a low noise amplifier.

19. An integrated circuit comprising:

a first signal line;

a second signal line, the first signal line and the second signal line forming a first differential pair of signal lines;

a first inductor that couples the first signal line to the second signal line;

a third signal line;

a fourth signal line, the third signal line and the fourth signal line forming a second differential pair of signal lines;

a second inductor that couples the third signal line to the fourth signal line, the first inductor having a non-zero magnetic coupling constant with the second inductor;

an amplifier disposed on the second differential pair of signal lines; and a crossover between the third signal line and the fourth signal line, the crossover being between the inductor and the amplifier.

20. The integrated circuit of claim 19, further comprising:

a third inductor that couples the third signal line to the fourth signal line, the third inductor being magnetically coupled to the second inductor; and an additional crossover between the third signal line and the fourth signal line, the second inductor and the third inductor being between the crossover and the additional crossover.

* * * * *